(12) United States Patent
Kim et al.

(10) Patent No.: US 9,608,452 B2
(45) Date of Patent: Mar. 28, 2017

(54) WIRELESS POWER TRANSMISSION SYSTEM, AND METHOD AND APPARATUS FOR CONTROLLING POWER IN WIRELESS POWER TRANSMISSION SYSTEM

(75) Inventors: Nam Yun Kim, Seoul (KR); Sang Wook Kwon, Seongnam-si (KR); Eun Seok Park, Youngin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1189 days.

(21) Appl. No.: 13/567,237

(22) Filed: Aug. 6, 2012

(65) Prior Publication Data
US 2013/0033117 A1 Feb. 7, 2013

(30) Foreign Application Priority Data
Aug. 5, 2011 (KR) .......................... 10-2011-0078103

(51) Int. Cl.
  *H02J 5/00* (2016.01)
  *H02J 7/02* (2016.01)
  *B60L 11/18* (2006.01)

(52) U.S. Cl.
CPC ............ *H02J 5/005* (2013.01); *B60L 11/182* (2013.01); *H02J 7/025* (2013.01); *Y02T 10/7005* (2013.01); *Y02T 10/7072* (2013.01); *Y02T 90/122* (2013.01); *Y02T 90/14* (2013.01); *Y02T 90/16* (2013.01)

(58) Field of Classification Search
CPC ......... H02J 5/005; H02J 7/025; B60L 11/182; Y02T 90/122; Y02T 90/16; Y02T 90/14; Y02T 10/7005

USPC ......................................................... 307/104
See application file for complete search history.

(56) References Cited

U.S. PATENT DOCUMENTS

| | | | |
|---|---|---|---|
| 2009/0072629 | A1 | 3/2009 | Cook et al. |
| 2009/0284218 | A1 | 11/2009 | Mohammadian et al. |
| 2010/0036773 | A1 | 2/2010 | Bennett |
| 2010/0201313 | A1 | 8/2010 | Vorenkamp et al. |

(Continued)

FOREIGN PATENT DOCUMENTS

| | | | |
|---|---|---|---|
| JP | 2001258182 A | * | 9/2001 |
| KR | 10-2010-0012944 A | | 2/2010 |

OTHER PUBLICATIONS

Machine Translated speccification of Takimoto et al. JP2001258182 A, Sep. 2001.*

(Continued)

*Primary Examiner* — Jared Fureman
*Assistant Examiner* — James Evans
(74) *Attorney, Agent, or Firm* — NSIP Law

(57) ABSTRACT

A wireless power transmission system, and an apparatus and method for controlling power in the wireless power transmission system are provided. The method includes determining a resonance frequency of the wireless power transmission system in which a wireless power transmission efficiency is greater than or equal to a predetermined value. The method further includes generating an operation power based on the wireless power transmission efficiency, the operation power being used to operate a target device. The method further includes transmitting the operation power to the target device. The method further includes controlling an amount of the operation power received by the target device to be within a predetermined range.

21 Claims, 17 Drawing Sheets

(56) References Cited

U.S. PATENT DOCUMENTS

| | | | |
|---|---|---|---|
| 2011/0062793 A1* | 3/2011 | Azancot | H01F 38/14 |
| | | | 307/116 |
| 2011/0081857 A1 | 4/2011 | Lee et al. | |
| 2011/0121658 A1 | 5/2011 | Fukada | |
| 2011/0148215 A1 | 6/2011 | Marzetta et al. | |
| 2011/0149818 A1 | 6/2011 | Choi et al. | |
| 2011/0154087 A1 | 6/2011 | Craine | |
| 2011/0193416 A1* | 8/2011 | Campanella | H01Q 7/00 |
| | | | 307/104 |
| 2011/0270462 A1* | 11/2011 | Amano | H02J 5/005 |
| | | | 700/297 |
| 2014/0091641 A1* | 4/2014 | Ichikawa | B60L 11/1846 |
| | | | 307/104 |

OTHER PUBLICATIONS

STIC Search Report.*
WO2011061821-A1 Machine Translation, May 2011.*

\* cited by examiner

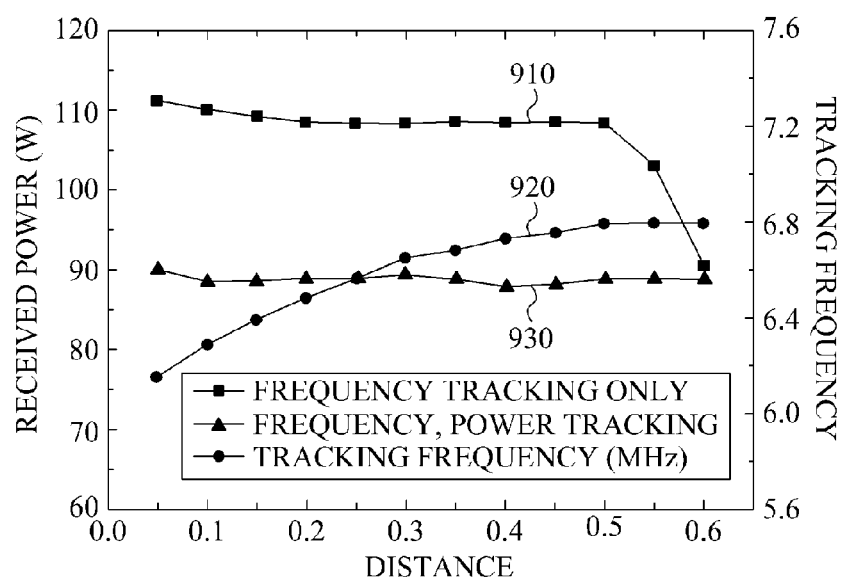

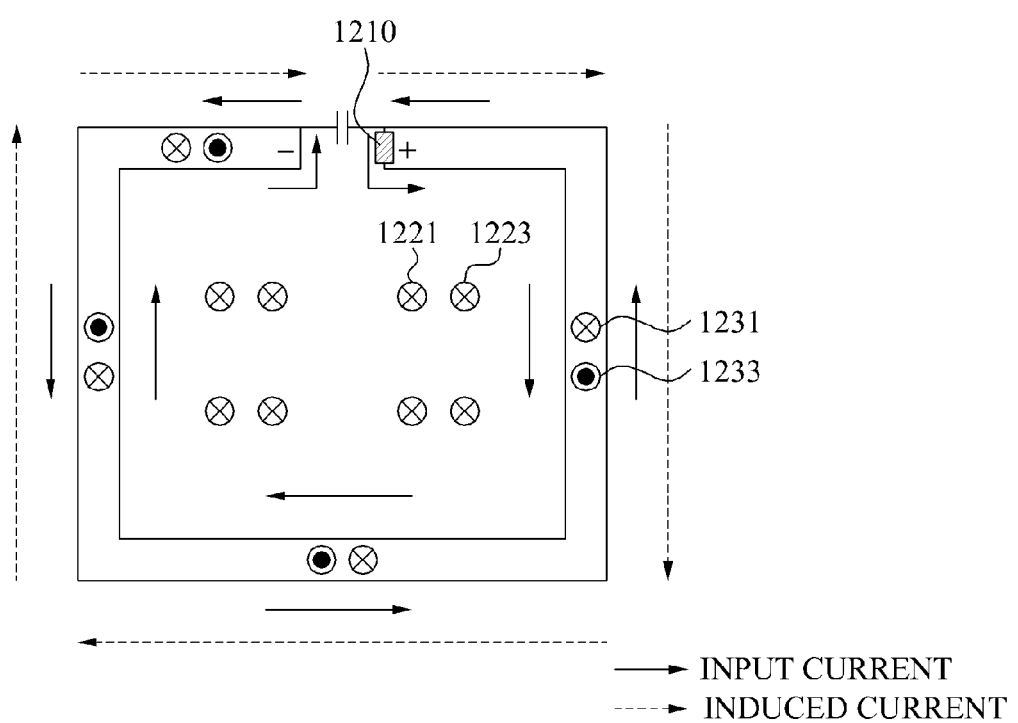

WIRELESS POWER TRANSMISSION SYSTEM, AND METHOD AND APPARATUS FOR CONTROLLING POWER IN WIRELESS POWER TRANSMISSION SYSTEM

CROSS-REFERENCE TO RELATED APPLICATION(S)

This application claims the benefit under 35 U.S.C. §119(a) of Korean Patent Application No. 10-2011-0078103, filed on Aug. 5, 2011, in the Korean Intellectual Property Office, the entire disclosure of which is incorporated herein by reference for all purposes.

BACKGROUND

1. Field

The following description relates to a method and apparatus for controlling power in a wireless power transmission system.

2. Description of Related Art

Wireless power refers to energy transferred from a wireless power transmitter to a wireless power receiver, for example, through magnetic coupling. A wireless power transmission system includes a source device and a target device. The source device may wirelessly transmit power, and the target device may wirelessly receive power. The source device may be referred to as a wireless power transmitter, and the target device may be referred to as a wireless power receiver.

The source device includes a source resonator, and the target device includes a target resonator. Magnetic coupling or resonance coupling may be formed between the source resonator and the target resonator.

Due to characteristics of a wireless environment, a distance between the source device and the target device, or matching requirements matching the source resonator and the target resonator, may be changed, which may result in a change in power transmission efficiency. However, a constant power transmission efficiency may be needed. To maintain the constant power transmission efficiency, a resonance frequency may need to be tracked accurately.

SUMMARY

In one general aspect, there is provided a method of controlling power in a wireless power transmission system, including determining a resonance frequency of the wireless power transmission system in which a wireless power transmission efficiency is greater than or equal to a predetermined value. The method further includes generating an operation power based on the wireless power transmission efficiency, the operation power being used to operate a target device. The method further includes transmitting the operation power to the target device. The method further includes controlling an amount of the operation power received by the target device to be within a predetermined range.

The method may further include generating the operation power further based on a dissipation power of the target device.

The determining of the resonance frequency may include supplying a voltage to a power converter. The determining of the resonance frequency may further include generating a tracking power based on the voltage and a reference resonance frequency, the tracking power being used to track the resonance frequency, and the power converter being configured to output the tracking power. The determining of the resonance frequency may further include transmitting the tracking power to the target device. The determining of the resonance frequency may further include determining a tracking power transmission efficiency. The determining of the resonance frequency may further include adjusting the reference resonance frequency if the tracking power transmission efficiency is less than the predetermined value.

The determining of the tracking power transmission efficiency may include detecting an amount of the tracking power output from the power converter. The determining of the tracking power transmission efficiency may further include receiving, from the target device, information on the amount of the tracking power received by the target device. The determining of the tracking power transmission efficiency may further include determining a ratio of the amount of the tracking power received by the target device to the amount of the tracking power output from the power converter.

The generating of the operation power may include receiving, from the target device, information on a dissipation power of the target device. The generating of the operation power may further include supplying a voltage to a power converter configured to output the operation power so that an amount of the operation power output from the power converter satisfies the following condition:

$$PA_{out} \geq P_{dissipation} \times \frac{1}{Est}.$$

PAout denotes the amount of the operation power output from the power converter, Pdissipation denotes the dissipation power of the target device, and Est denotes the wireless power transmission efficiency.

The controlling of the amount of the operation power may include detecting the amount of the operation power received by the target device. The controlling of the amount of the operation power may further include determining whether the amount of the operation power received by the target device is within the predetermined range. The controlling of the amount of the operation power may further include continuing to transmit the operation power to the target device if the amount of the power received by the target device is within the predetermined range. The controlling of the amount of the operation power may further include controlling an amount of the operation power based on a predetermined window size if the amount of the power received by the target device is beyond the predetermined range.

The controlling of the amount of the operation power may further include supplying a voltage to a power converter. The controlling of the amount of the operation power may further include decreasing the voltage if the amount of the power received by the target device is greater than a first reference value. The controlling of the amount of the operation power may further include increasing the voltage if the amount of the power received by the target device is less than a second reference value. The controlling of the amount of the operation power may further include redetermining the resonance frequency if the voltage is increased and the wireless power transmission efficiency is not maintained.

The continuing to transmit the operation power may include supplying a voltage to a power converter. The continuing to transmit the operation power may further include detecting a change in a dissipation power of the target device. The continuing to transmit the operation power may further include adjusting the voltage based on the change in the dissipation power.

The method may further include supplying a voltage to a power converter. The method may further include detecting a charging state of a battery. The method may further include adjusting the voltage based on the charging state of the battery.

In another general aspect, there is provided a method of controlling power in a wireless power transmission system, including determining a resonance frequency of the wireless power transmission system in which a wireless power transmission efficiency is greater than or equal to a predetermined value. The method includes generating a power based on the wireless power transmission efficiency. The method includes transmitting the power to a target device. The method includes controlling an amount of the power received by the target device to be within a predetermined range.

The controlling of the amount of the power may include detecting the amount of the power received by the target device. The controlling of the amount of the power may further include determining whether the amount of the power received by the target device is within the predetermined range. The controlling of the amount of the power may further include continuing to transmit the power to the target device if the amount of the power received by the target device is within the predetermined range. The controlling of the amount of the power may further include controlling an amount of the power based on a predetermined window size if the amount of the power received by the target device is beyond the predetermined range.

In still another general aspect, there is provided a method of controlling power in a wireless power transmission system, including receiving a tracking power from a source device, the tracking power being used to track a resonance frequency of the wireless power transmission system. The method further includes receiving an operation power from the source device if the resonance frequency is tracked by the source device, the operation power being used to operate a target device. The method further includes transmitting, to the source device, information on an amount of the received tracking power, a dissipation power of the target device, and an amount of the received operation power. The method further includes controlling the amount of the received operation power to be within a predetermined range.

The method may further include detecting information on a charging state of a rechargeable battery. The method may further include transmitting the detected information to the source device.

In yet another general aspect, there is provided a source device in a wireless power transmission system, including a controller configured to determine a resonance frequency of the wireless power transmission system in which a wireless power transmission efficiency is greater than or equal to a predetermined value. The source device further includes a power converter configured to generate and output an operation power based on the wireless power transmission efficiency, the operation power being used to operate a target device. The source device further includes a source resonator configured to transmit the operation power to the target device. The controller is further configured to control an amount of the operation power received by the target device to be within a predetermined range.

The controller may be further configured to generate the operation power based on a dissipation power of the target device.

The controller may be further configured to supply a voltage to the power converter. The power converter may be further configured to generate a tracking power based on the voltage and a reference resonance frequency, the tracking power being used to track the resonance frequency, and transmit the tracking power to the target device. The controller may be further configured to determine a tracking power transmission efficiency, and adjust the reference resonance frequency if the tracking power transmission efficiency is less than the predetermined value.

The controller may be further configured to receive, from the target device, information on a dissipation power of the target device. The controller may be further configured to supply a voltage to the power converter so that an amount of the operation power output from the power converter satisfies the following condition:

$$PA_{Out} \geq P_{dissipation} \times \frac{1}{E_{ST}}.$$

PAout denotes the amount of the operation power output from the power converter, Pdissipation denotes the dissipation power of the target device, and Est denotes the wireless power transmission efficiency.

The controller may be further configured to detect the amount of the operation power received by the target device. The controller may be further configured to determine whether the amount of the power received by the target device is within the predetermined range. The controller may be further configured to control an amount of the operation power based on a predetermined window size if the amount of the power received by the target device is beyond the predetermined range.

The controller may further configured to supply a voltage to a power converter. The controller may be further configured to detect a change in a dissipation power of the target device if the amount of the power received by target device is within the predetermined range. The controller may be further configured to adjust the voltage based on the change in the dissipation power.

In still another general aspect, there is provided a target device in a wireless power transmission system, including a target resonator configured to receive a tracking power from a source device, the tracking power being used to track a resonance frequency of the wireless power transmission system. The target resonator is further configured to receive an operation power from the source device if the resonance frequency is tracked by the source device, the operation power being used to operate the target device. The target device further includes a controller configured to transmit, to the source device, information on an amount of the received tracking power, a dissipation power of the target device, and an amount of the received operation power. The target device is further configured to control the amount of the received operation power to be within a predetermined range.

The target device may further include a rechargeable battery. The controller may be further configured to detect information on a charging state of the rechargeable battery, and transmit the detected information to the source device.

Other features and aspects may be apparent from the following detailed description, the drawings, and the claims.

BRIEF DESCRIPTION OF THE DRAWINGS

FIG. 9 is a diagram illustrating an example of a concept of the frequency tracking mode and the power tracking mode.

FIG. 12A is a diagram illustrating an example of a distribution of a magnetic field in a resonator based on feeding of a feeding unit.

Figure 1:
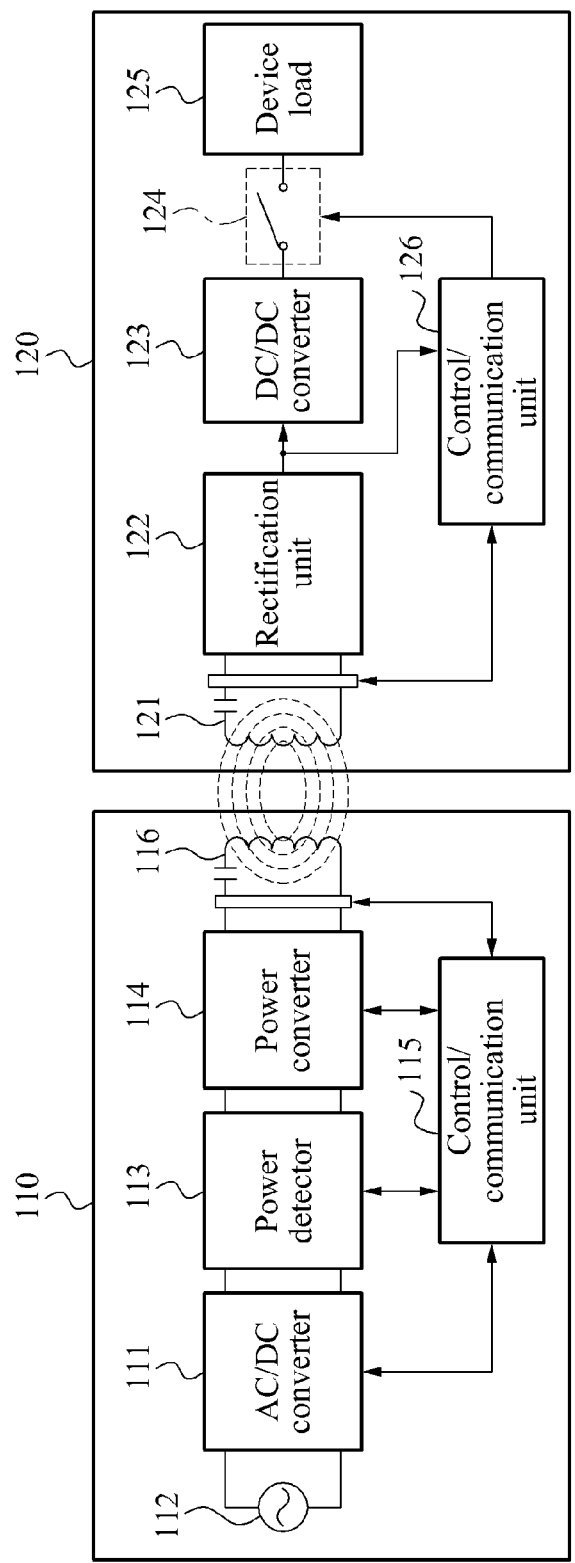
FIG. 1 is a diagram illustrating an example of a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of a wireless power transmission system. The wireless power transmission system includes a source device 110 and a target device 120.

The source device 110 includes an alternating current-to-direct current (AC/DC) converter 111, a power detector 113, a power converter 114, a control/communication unit (e.g., a controller) 115, and a source resonator 116. The target device 120 includes a target resonator 121, a rectification unit 122, a DC-to-DC (DC/DC) converter 123, a switch unit 124, a device load 125, and a control/communication unit (e.g., a controller) 126.

The AC/DC converter 111 rectifies AC voltage (e.g., in a band of tens of hertz (Hz)) output from a power supply 112 to generate a DC voltage. The AC/DC converter 111 may output DC voltage of a predetermined level, may adjust an output level of the DC voltage based on a control of the control/communication unit 115, or both.

The power detector 113 detects an output current and an output voltage of the AC/DC converter 111, and transfers, to the control/communication unit 115, information on the detected current and the detected voltage. Additionally, the power detector 113 may detect an input current and an input voltage of the power converter 114.

The power converter 114 converts the DC voltage to an AC voltage to generate a tracking power and an operation power based on a resonance frequency. For example, the power converter 114 may generate the tracking power and the operation power based on a supplied voltage and a reference resonance frequency. The tracking power is used to track the resonance frequency, and the operation power is used to operate the target device 120. The tracking power may include a low power of 0.1 milliwatt (mW) to 1 mW, and the operation power may include a high power of 1 mW to 200 W that is transmitted to the target device 120. Additionally, the power converter 114 may generate the operation power based on a power transmission efficiency and a dissipation power of the target device 120.

The power converter 114 may convert the DC voltage of the predetermined level to the AC voltage to generate the powers based on a switching pulse signal in a band of tens of kilohertz (KHz) to tens of megahertz (MHz). In another example, the power converter 114 may convert the DC voltage to the AC voltage based on the resonance frequency to generate a charging power, which may be used in the target device 120. The charging power may include a high power of 1 mW to 200 W that is transmitted to the target device 120.

In examples described herein, the term "charging" may refer to supplying a power to a unit or element that is configured to charge power. Additionally, the term "charging" may refer to supplying a power to a unit or element that is configured to consume power. For example, charging power may refer to a power required to charge a battery of a target device, or a power consumed in an operation of a target device. The units or elements may include, for example, batteries, displays, sound output circuits, main processors, and/or various sensors.

Additionally, the term "reference resonance frequency" may refer to a resonance frequency used by the source device 110. Furthermore, the term "tracking frequency" may refer to a resonance frequency adjusted by a preset scheme.

The control/communication unit 115 determines the resonance frequency in which a power transmission efficiency associated with wireless power transmission (hereinafter, referred to as a "wireless power transmission efficiency") is greater than or equal to a predetermined value. The control/communication unit 115 performs power control so that an amount of power received by the target device 120 is maintained within a predetermined range.

The control/communication unit 115 detects a reflected wave of the tracking power and/or the charging power, and detects mismatching between the target resonator 121 and the source resonator 116 based on the detected reflected wave. To detect the mismatching, the control/communication unit 115 may detect an envelope of the reflected wave, detect an amount of power of the reflected wave, or both.

The control/communication unit 115 may determine a voltage standing wave ratio (VSWR) based on a voltage level of the reflected wave, and a level of an output voltage of the source resonator 116 or the power converter 114. For example, when the VSWR is less than a predetermined value, the control/communication unit 115 may determine that the mismatching is detected.

The control/communication unit 115 determines a power transmission efficiency for each of N tracking frequencies, determines a tracking frequency $F_{Best}$ with the best power transmission efficiency among the N tracking frequencies, and adjusts a reference resonance frequency $F_{Ref}$ to the tracking frequency $F_{Best}$. The N tracking frequencies may be set in advance.

Additionally, the control/communication unit 115 may adjust a frequency of the switching pulse signal. Under the control of the control/communication unit 115, the frequency of the switching pulse signal may be determined. By controlling the power converter 114, the control/communication unit 115 may generate a modulation signal to be transmitted to the target device 120. The control/communication unit 115 may transmit various messages to the target device 120 via in-band communication. Additionally, the control/communication unit 115 may demodulate a signal received from the target device 120 through the envelope of the detected reflected wave.

The control/communication unit 115 may generate the modulation signal for the in-band communication, using various schemes. For example, the control/communication unit 115 may generate the modulation signal by turning on and off the switching pulse signal, by performing delta-sigma modulation, and/or by performing any other type of modulation known to one of ordinary skill in the art. Additionally, the control/communication unit 115 may generate a pulse-width modulation (PWM) signal with a predetermined envelope.

The control/communication unit 115 may perform out-band communication based on a communication channel. The control/communication unit 115 may include a communication module, such as one configured to process, for example, ZigBee, Bluetooth, and/or any other communication protocol known to one of ordinary skill in the art. The control/communication unit 115 may transmit and receive data to and from the target device 120 via the out-band communication.

The control/communication unit 115 receives, from the target device 120, information on the dissipation power of the target device 120, and controls a voltage supplied to the power converter 114 so that an amount of power output from the power converter 114 satisfies the following condition 1:

$$PA_{out} \geq P_{dissipation} \times \frac{1}{Est} \qquad \text{[Condition 1]}$$

In Condition 1, $PA_{out}$ denotes the amount of the power output from the power converter 114, $P_{dissipation}$ denotes the dissipation power of the target device 120, and Est denotes the wireless power transmission efficiency.

The control/communication unit 115 detects the amount of the power received by the target device 120. In an example in which the amount of the power received by the target device 120 is determined to be beyond the predetermined range, the control/communication unit 115 redetermines the resonance frequency, and controls an amount of the operation power based on a predetermined window size. In another example in which the amount of the power received by the target device 120 is determined to be within the predetermined range, the control/communication unit 115 detects a change in the dissipation power, and adjusts the voltage supplied to the power converter 114 based on the detected change in the dissipation power.

The source resonator 116 transfers an electromagnetic energy to the target resonator 121. For example, the source resonator 116 transfers, to the target device 120, the tracking power and the operation power, via magnetic coupling with the target resonator 121.

The target resonator 121 receives the electromagnetic energy from the source resonator 116. For example, the target resonator 121 receives, from the source device 110, the tracking power and the operation power, via the magnetic coupling with the source resonator 116. Additionally, the target resonator 121 may receive various messages from the source device 110 via the in-band communication.

The rectification unit 122 rectifies an AC voltage to generate a DC voltage. The AC voltage is received from the target resonator 121.

The DC/DC converter 123 adjusts a level of the DC voltage output from the rectification unit 122 based on a capacity of the device load 125, and provides, to the device load 125, the DC voltage with the adjusted level. For example, the DC/DC converter 123 may adjust, to 3 volt (V) to 10 V, the level of the DC voltage output from the rectification unit 122.

The switch unit 124 is turned on and off under the control of the control/communication unit 126. When the switch unit 124 is turned off, the control/communication unit 115 of the source device 110 detects the reflected wave. In other words, when the switch unit 124 is turned off, the magnetic coupling between the source resonator 116 and the target resonator 121 is eliminated.

The device load 125 may include a battery. The device load 125 may charge the battery using the DC voltage output from the DC/DC converter 123.

The control/communication unit 126 transmits, to the source device 110, information on an amount of the received tracking power, an amount of the dissipation power of the device load 125, and an amount of the received operation power. The amount of the received operation power is maintained within a predetermined range. The control/communication unit 126 may detect information on a charging state of a rechargeable battery, and may transmit the detected information to the source device 110. The information on the charging state may include, for example, an amount of current flowing to the rechargeable battery, a voltage applied to the rechargeable battery, and/or any other information known to one of ordinary skill in the art.

The control/communication unit 126 may perform in-band communication to transmit or receive data based on the resonance frequency. During the in-band communication, the control/communication unit 126 may demodulate a received signal by detecting a signal between the target resonator 121 and the rectification unit 122, or by detecting an output signal of the rectification unit 122. The control/communication unit 126 may demodulate a message received via the in-band communication. Additionally, the control/communication unit 126 may adjust an impedance of the target resonator 121, or may turn on and off the switch unit 124, to modulate the signal to be transmitted to the source device 110. For example, the control/communication unit 126 may increase the impedance of the target resonator 121 so that the control/communication unit 115 of the source device 110 may detect the reflected wave. Depending on whether the reflected wave is detected, the control/communication unit 115 may detect a binary number (e.g., "0" or "1").

The control/communication unit 126 transmits a response message to a wireless power transmitter, e.g., the source device 110. The response message may include, for example, a type of a corresponding target device (e.g., the target device 120), information on a manufacturer of the corresponding target device, a model name of the corresponding target device, a battery type of the corresponding target device, a scheme of charging the corresponding target device, an impedance value of a load of the corresponding target device, information on characteristics of a target resonator (e.g., the target resonator 121) of the corresponding target device, information on a frequency band used by the corresponding target device, an amount of power consumed by the corresponding target device, an identifier (ID) of the corresponding target device, and/or information on a version or standard of the corresponding target device.

The control/communication unit 126 may also perform out-band communication using a communication channel. The control/communication unit 126 may include a communication module, such as one configured to process, for example, ZigBee, Bluetooth, and/or any other communication protocol known to one of ordinary skill in the art. The control/communication unit 126 may transmit and receive data to and from the source device 110 via the out-band communication.

The control/communication unit 126 receives a wake-up request message from the wireless power transmitter (e.g., the source device 110), detects an amount of power received at the target resonator 121, and transmits, to the source device 110, information on the detected amount of the power. The information on the detected amount may include, for example, an input voltage value and an input current value of the rectification unit 122, an output voltage value and an output current value of the rectification unit 122, an output voltage value and an output current value of the DC/DC converter 123, and/or any other information known to one of ordinary skill in the art.

The control/communication unit 115 sets a resonance bandwidth of the source resonator 116. Based on the setting of the resonance bandwidth of the source resonator 116, a Q-factor of the source resonator 116 may be determined.

Additionally, the control/communication unit 126 sets a resonance bandwidth of the target resonator 121. Based on the setting of the resonance bandwidth of the target resonator 121, a Q-factor of the target resonator 121 may be determined. For example, the resonance bandwidth of the source resonator 116 may be set to be wider or narrower than the resonance bandwidth of the target resonator 121. The source device 110 and the target device 120 communicate with each other in order to share information on the resonance bandwidth of the source resonator 116 and the resonance bandwidth of the target resonator 121. In an example in which a power desired and/or required by the target device 120 is higher than a reference value, the Q-factor of the source resonator 116 may be set to a value greater than 100. In another example in which the power desired and/or required by the target device 120 is lower than the reference value, the Q-factor of the source resonator 116 may be set to a value less than 100.

In a wireless power transmission employing a resonance scheme, a resonance bandwidth of a resonator is a factor. A Q-factor Qt may consider a change in a distance between the source resonator 116 and the target resonator 121, a change in a resonance impedance, impedance mismatching, a reflected signal, and any other factor known to one of ordinary skill in the art. In this example, the Q-factor Qt may include an inverse-proportional relationship with the resonance bandwidth, as given by Equation 1.

$$\frac{\Delta f}{f_0} = \frac{1}{Qt}$$
$$= \Gamma_{S,D} + \frac{1}{BW_S} + \frac{1}{BW_D}$$

[Equation 1]

In Equation 1, $f_0$ denotes a central frequency, $\Delta f$ denotes a change in a bandwidth, $\Gamma_{S,D}$ denotes a reflection loss between the source resonator 116 and the target resonator 121, $BW_S$ denotes the resonance bandwidth of the source resonator 116, and $BW_D$ denotes the resonance bandwidth of the target resonator 121.

An efficiency U of the wireless power transmission may be defined, as given in the example of Equation 2.

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa}$$

[Equation 2]

In Equation 2, $\kappa$ denotes a coupling coefficient of energy coupling between the source resonator 116 and the target resonator 121, $\Gamma_S$ denotes a reflection coefficient in the source resonator 116, $\Gamma_D$ denotes a reflection coefficient in the target resonator 121, $\omega_0$ denotes the resonance frequency, M denotes a mutual inductance between the source resonator 116 and the target resonator 121, $R_S$ denotes an impedance of the source resonator 116, $R_D$ denotes an impedance of the target resonator 121, $Q_S$ denotes the Q-factor of the source resonator 116, $Q_D$ denotes the Q-factor of the target resonator 121, and $Q_K$ denotes a Q-factor of the energy coupling between the source resonator 116 and the target resonator 121. As shown in Equation 2, the Q-factors may include a high relevance to the efficiency of the wireless power transmission.

Accordingly, to increase the efficiency of the wireless power transmission, the Q-factors may be set to high values. For example, when the Q-factors $Q_S$ and $Q_D$ are set to extremely high values, the efficiency of the wireless power transmission may be reduced due to a change in the coupling coefficient $\kappa$, a change in the distance between the source resonator 116 and the target resonator 121, a change in the resonance impedance, impedance mismatching, and/or any other factor known to one of ordinary skill in the art.

Additionally, to increase the efficiency of the wireless power transmission, the resonance bandwidth of the source resonator 116 and the resonance bandwidth of the target resonator 121 may be set to be excessively narrow. However, impedance mismatching and/or any other problems known to one of ordinary skill in the art, may occur due to even a small external effect. Considering the impedance mismatching, Equation 1 may be represented as given in Equation 3.

$$\frac{\Delta f}{f_0} = \frac{\sqrt{VSWR} - 1}{Qt\sqrt{VSWR}}$$

[Equation 3]

In an example in which an unbalanced relationship of a resonance bandwidth or a bandwidth of an impedance matching frequency between the source resonator 116 and the target resonator 121 is maintained, a reduction in the efficiency of the wireless power transmission may be prevented due to a change in the coupling coefficient κ, a change in the distance between the source resonator 116 and the target resonator 121, a change in the resonance impedance, impedance mismatching, and/or any other factor known to one of ordinary skill in the art. In an example in which the unbalanced relationship of the resonance bandwidth or the bandwidth of the impedance matching frequency between the source resonator 116 and the target resonator 121 is maintained, based on Equations 1 and 3, an unbalanced relationship between the Q-factors $Q_S$ and $Q_D$ may also be maintained.

Figure 2:
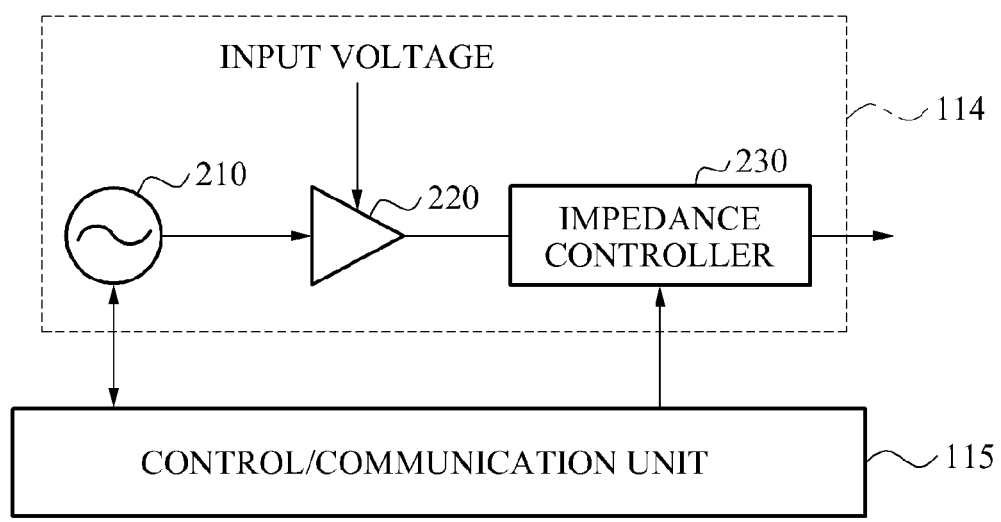
FIG. 2 is a block diagram illustrating an example of a power converter.

FIG. 2 illustrates, in greater detail, an example of the power converter 114 of FIG. 1. Referring to FIG. 2, the power converter 114 includes a switching pulse signal generator 210, a power amplifier 220, and an impedance controller 230.

The switching pulse signal generator 210 generates a switching pulse signal in a band of a few MHz to tens of MHz. A frequency of the generated switching pulse signal is determined under the control of the control/communication unit 115. For example, if the reference resonance frequency $F_{Ref}$ of the source resonator 116 of FIG. 1 is set to 13.56 MHz or 5.78 MHz, the control/communication unit 115 controls the switching pulse signal generator 210 so that the frequency of the switching pulse signal is set to 13.56 MHz or 5.78 MHz. The switching pulse signal generator 210 may include capacitors and a switch, for example. The switching pulse signal generator 210 may switch the capacitors to adjust the frequency of the switching pulse signal.

The power amplifier 220 generates an AC power based on the switching pulse signal output from the switching pulse signal generator 210. For example, the power amplifier 220 generates a tracking power and an operation power by adjusting an input voltage of the power amplifier 220 based on the switching pulse signal.

The impedance controller 230 adjusts an impedance of the source resonator 116 under the control of the control/communication unit 115. The control/communication unit 115 adjusts a signal level of the input voltage of the power amplifier 220 based on a number of target devices. Additionally, the control/communication unit 115 adjusts the reference resonance frequency $F_{Ref}$ based on a reflected wave of the operation power, an amount of power received at each of target devices, an amount of a charging power, and/or a power transmission efficiency of the charging power. For example, if the power transmission efficiency of the charging power is less than a predetermined value, the control/communication unit 115 adjusts the reference resonance frequency $F_{Ref}$.

Figure 3:
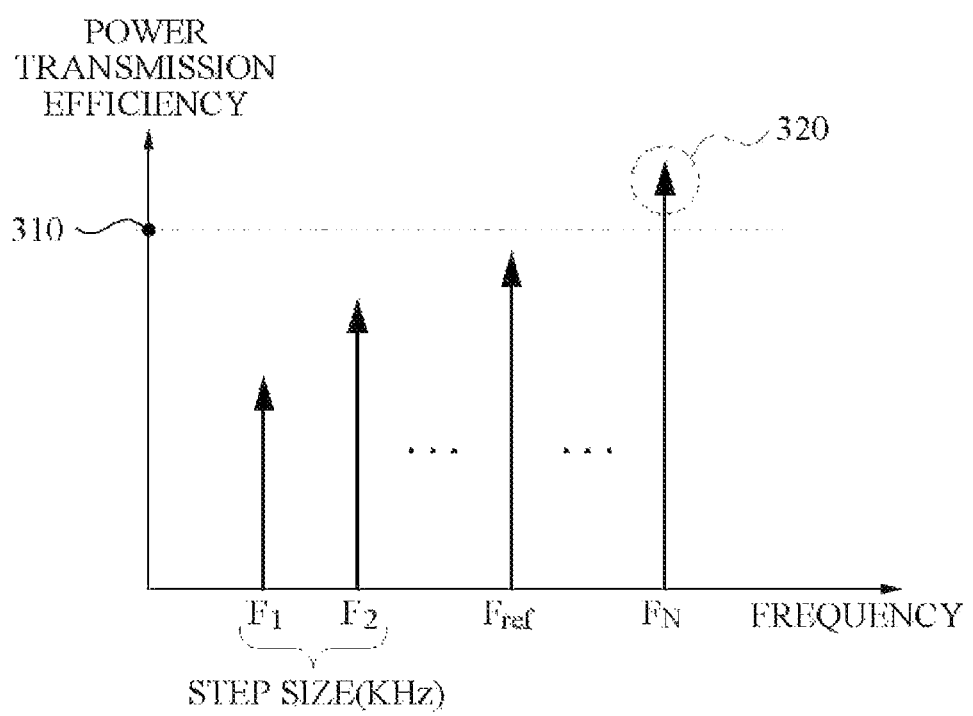
FIG. 3 is a diagram illustrating an example of a method of determining a resonance frequency in which a power transmission efficiency is greater than or equal to a predetermined value.

FIG. 3 illustrates an example of a method of determining a resonance frequency in which a power transmission efficiency is greater than or equal to a predetermined value. Reference numeral 310 indicates the predetermined value of the power transmission efficiency. A source device transmits a tracking power to a target device using a reference resonance frequency $F_{ref}$. For example, if a power transmission efficiency of a tracking power at a reference resonance frequency $F_1$ is less than the predetermined value, the power transmission efficiency of the tracking power is redetected after adjusting the reference resonance frequency $F_1$ by a step size in KHz to, e.g., a second resonance frequency $F_2$. The reference resonance frequency may be adjusted sequentially or randomly. The reference resonance frequency is adjusted until a resonance frequency $F_N$ in which a power transmission efficiency 320 is greater than the predetermined value 310. Accordingly, the resonance frequency $F_N$ is determined.

Figure 4:
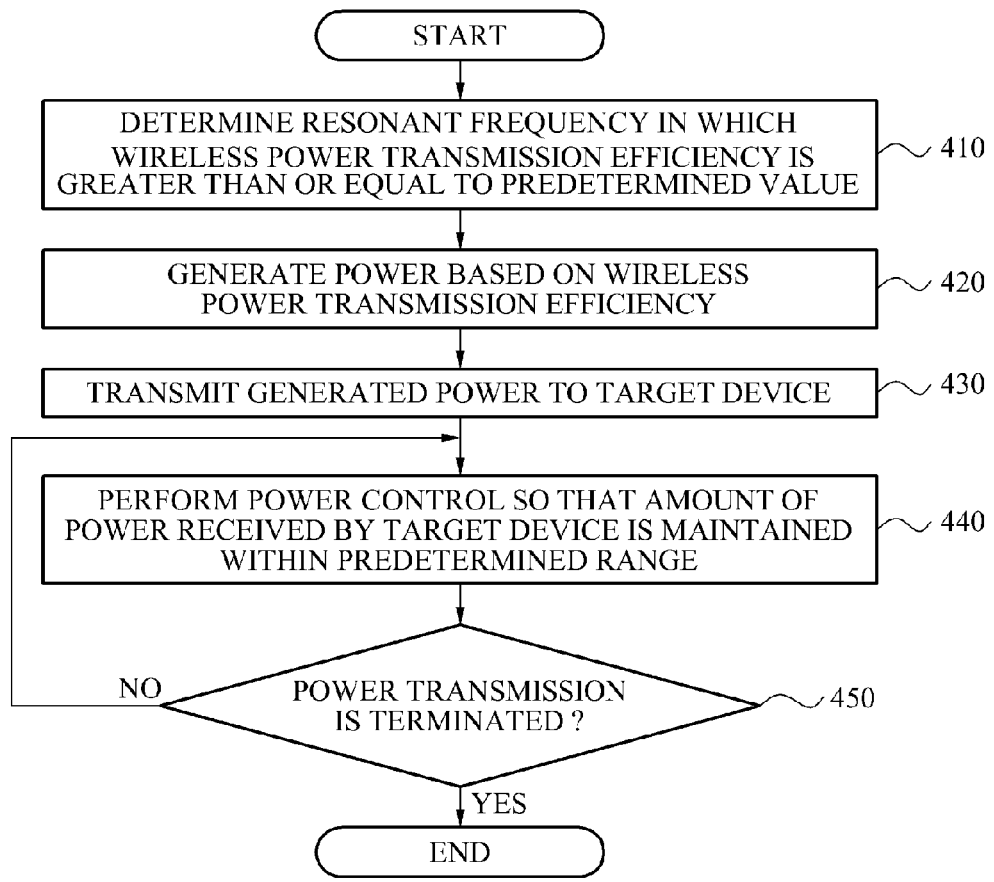
FIG. 4 is a flowchart illustrating an example of a method of controlling power in a wireless power transmission system.

FIG. 4 illustrates an example of a method of controlling power in a wireless power transmission system. In operation 410, a source device determines a resonance frequency in which a wireless power transmission efficiency is greater than or equal to a predetermined value. In various examples, the wireless power transmission efficiency may include a power transmission efficiency of a tracking power or an operation power. The wireless power transmission efficiency may be determined to be a ratio of an amount of power received by a target device to an amount of power output from a power converter in the source device. For example, a wireless power transmission efficiency Est may include a value of $P_{receive}/PA_{out}$. The amount of the power output from the power converter may be represented by $PA_{out}$, and the amount of the power received by the target device may be represented by $P_{receive}$.

In operation 420, the source device generates a power based on the wireless power transmission efficiency. For example, the source device may generate a power greater than $P_{dissipation}/\text{Est}$. As described above, $P_{dissipation}$ indicates a dissipation power of the target device. Additionally, the dissipation power of the target device may refer to an amount of power required to operate the target device. For example, if the wireless power transmission efficiency is 0.8, and the target device requires a dissipation power of 10 W, the source device generates a power of at least 12.5 W.

In operation 430, the source device transmits the generated power to the target device using magnetic coupling with the target device. In operation 440, the source device performs a power control so that the amount of the power received by the target device is maintained within a predetermined range. For example, the source device may periodically receive, from the target device, information on the amount of the received power. In this example, if the amount of the received power is beyond the predetermined range, the source device adjusts the resonance frequency so that the amount of the received power is maintained within the predetermined range. Additionally, the source device may periodically detect a change in a load of the target device, and may adjust the amount of power output from a power converter based on the detected change in the load. In this example, the source device may detect the amount of the received power, and may determine whether the amount of the received power is within the predetermined range. If the amount of the received power is determined to be within the predetermined range, the source device continues to transmit the generated power to the target device. If the amount of the received power is determined to be beyond the predetermined range, the source device adjusts the resonance frequency.

In operation 450, the source device determines whether the power transmission is terminated. For example, if the target device does not exist, e.g., within a predetermined distance from the source device, if a dissipation of power by the target device is terminated, or if a charging of the target device is completed, the power transmission is terminated. If the power transmission is not terminated, the source device reperforms operation 440. Otherwise, the method ends.

Figure 5:
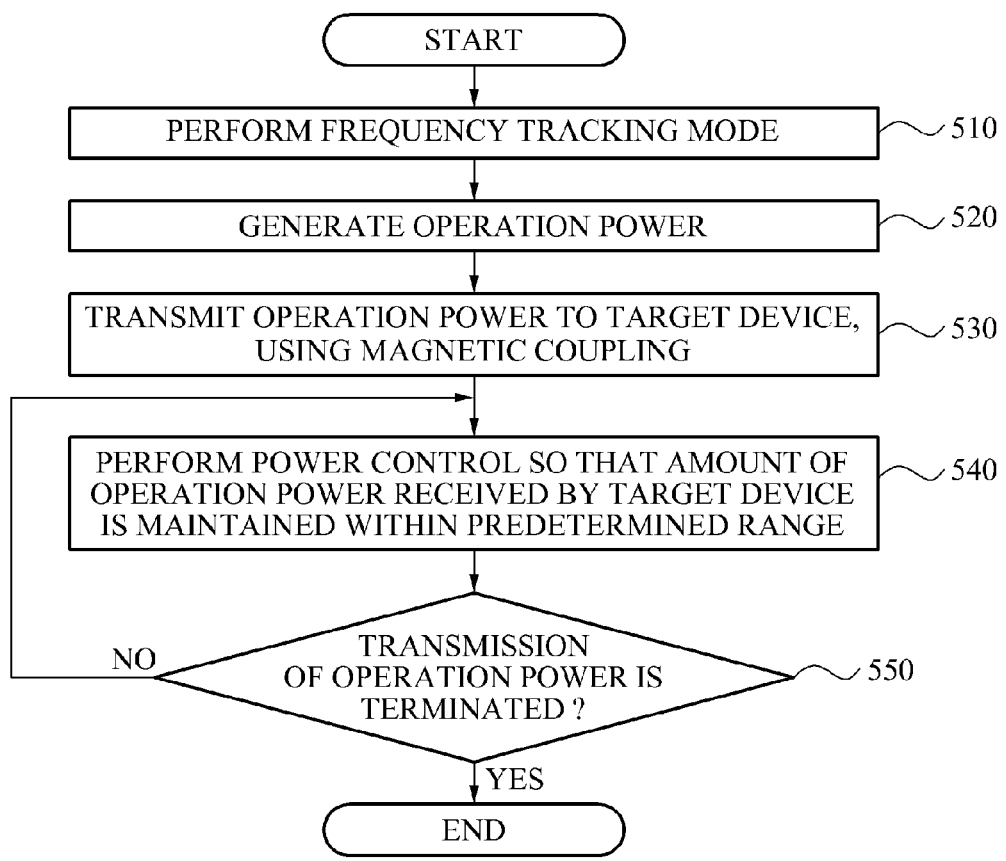
FIG. 5 is a flowchart illustrating another example of a method of controlling power in a wireless power transmission system.

FIG. 5 illustrates another example of a method of controlling power in a wireless power transmission system. In operation 510, a source device performs a frequency tracking mode. The frequency tracking mode refers to a method of determining a resonance frequency in which a wireless power transmission efficiency is greater than or equal to a predetermined value. Operation 510 will be further described with reference to FIG. 6 below.

In operation 520, the source device generates an operation power based on a wireless power transmission efficiency and a dissipation power of a target device. The operation power is used to operate the target device. Operation 520 will be further described with reference to FIG. 7 below.

In operation 530, the source device transmits the generated operation power to the target device, using magnetic coupling with the target device. If the resonance frequency is tracked by the source device, the target device receives the operation power from the source device. The target device notifies the source device of an amount of the received operation power, and receives the operation power while maintaining the amount of the received operation power within a predetermined range.

In operation 540, the source device performs a power control so that the amount of the operation power received by the target device is maintained within the predetermined range. Operation 540 will be further described with reference to FIG. 8A below.

In operation 550, the source device determines whether the transmission of the operation power is terminated. For example, if the target device does not exist, e.g., within a predetermined distance from the source device, if a dissipation of power by the target device is terminated, or if charging of the target device is completed, the transmission of the operation power is terminated. If the transmission of the operation power is not terminated, the source device reperforms operation 540. Otherwise, the method ends.

Figure 6:
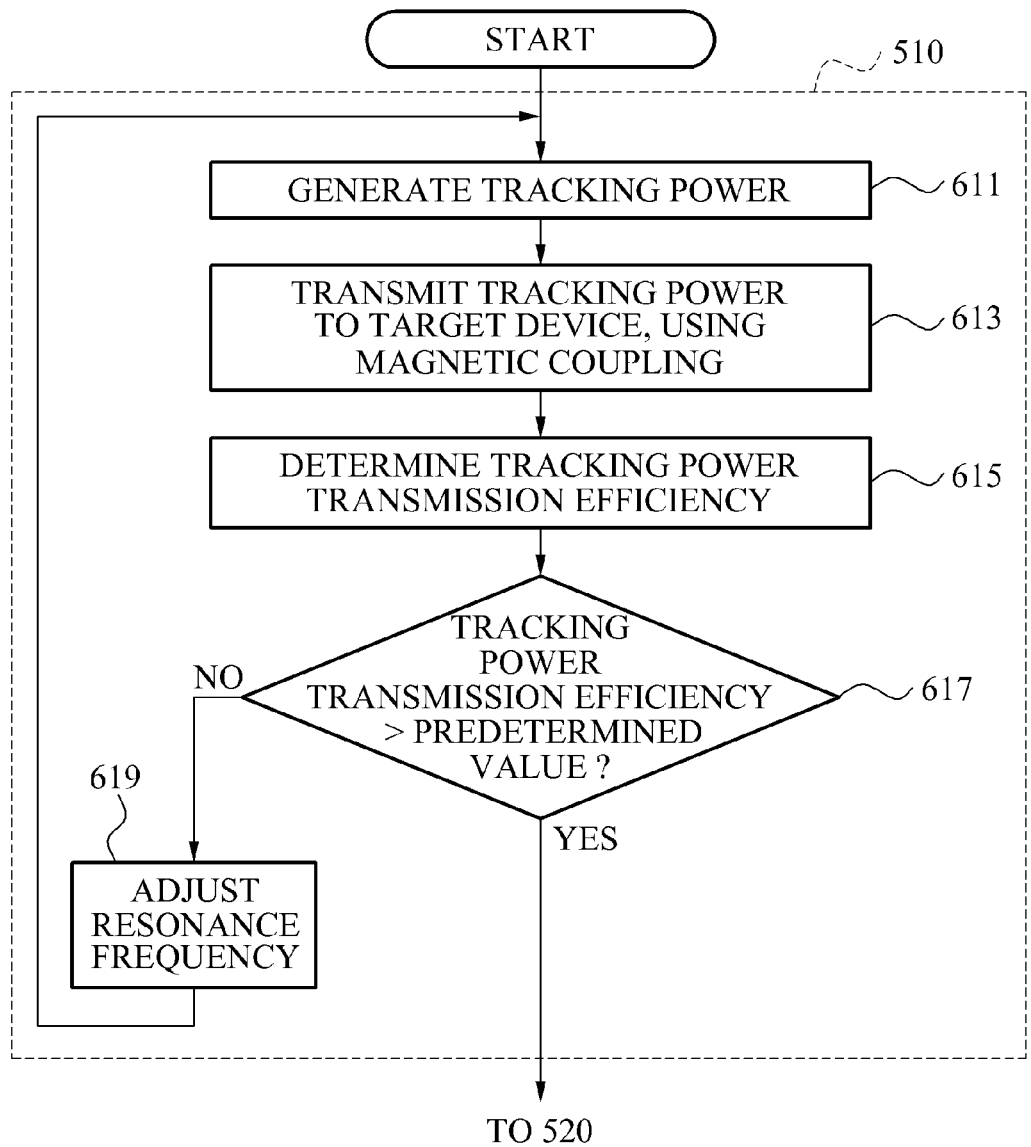
FIG. 6 is a flowchart illustrating an example of a frequency tracking mode.

FIG. 6 illustrates a frequency tracking mode in operation 510 of FIG. 5. Referring to FIG. 6, in operation 611, the source device generates a tracking power based on a reference resonance frequency and a voltage supplied to a power converter in the source device. The tracking power is used to track a resonance frequency.

In operation 613, the source device transmits the generated tracking power to the target device, using the magnetic coupling. Accordingly, the target device receives the tracking power from the source device using the magnetic coupling.

In operation 615, the source device determines a power transmission efficiency of the tracking power, hereinafter referred to as a tracking power transmission efficiency. For example, the source device detects an amount of the tracking power output from the power converter, and receives, from the target device, information on an amount of the tracking power received by the target device. The source device determines a ratio of the amount of the received tracking power to the amount of the output tracking power. In other words, the source device determines the tracking power transmission efficiency based on the amount of the received tracking power and the amount of the output tracking power. In this example, the target device transmits, to the source device, the information on the amount of the received tracking power and a dissipation power of the target device.

In operation 617, the source device determines whether the tracking power transmission efficiency is greater than a predetermined value. If the tracking power transmission efficiency is greater than the predetermined value, the source device performs operation 520 of FIG. 5.

If the tracking power transmission efficiency is less than or equal to the predetermined value, in operation 619, the source device adjusts the reference resonance frequency. To adjust the reference resonance frequency, the method of FIG. 3 may be used. The source device reperforms operation 611.

Figure 7:
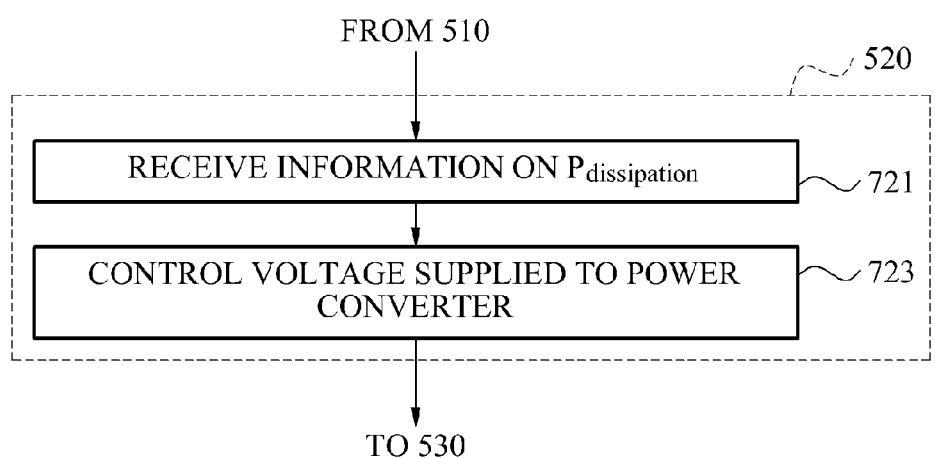
FIGS. 7 and 8A are flowcharts illustrating an example of a power tracking mode.
Figure 8A:
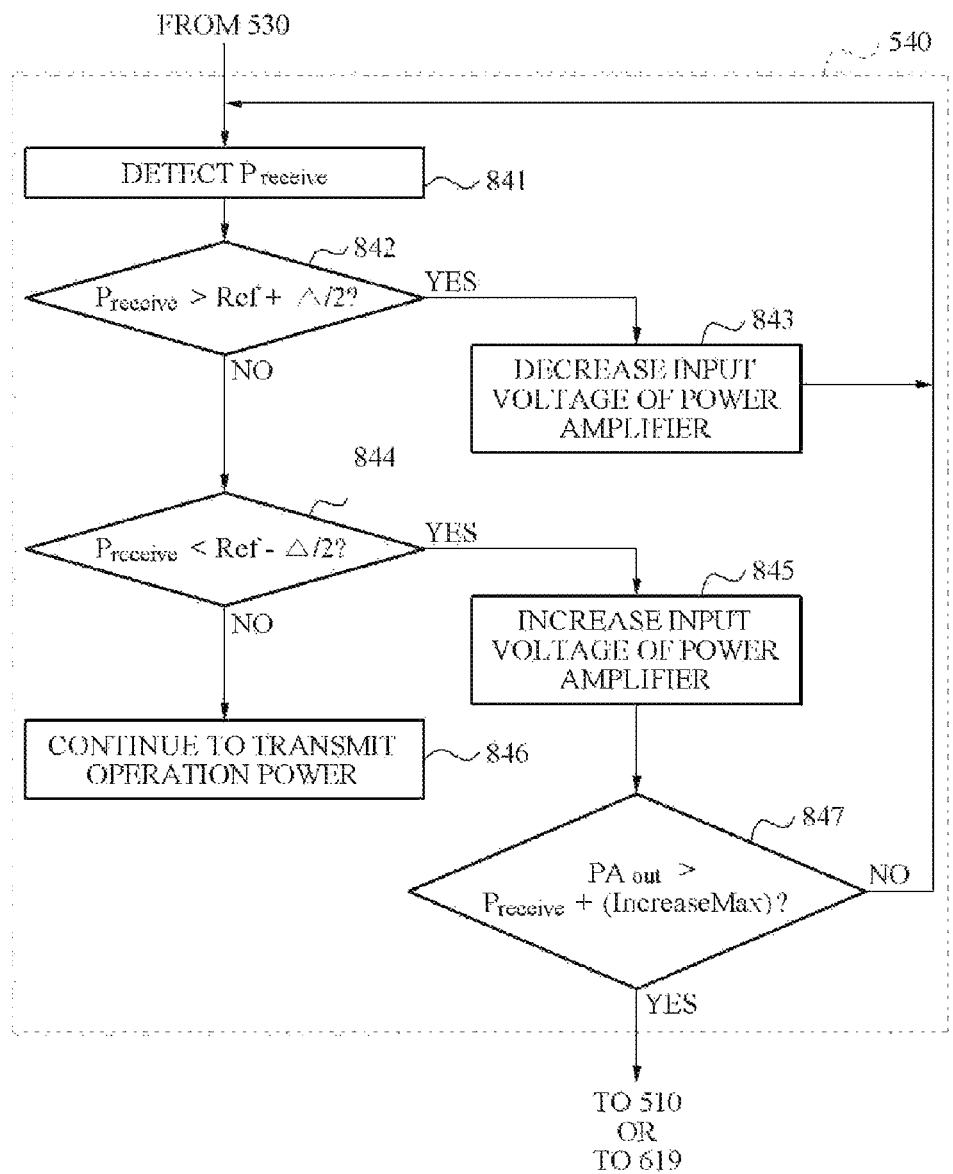

FIGS. 7 and 8A illustrate an example of the power tracking mode in operations 520 and 540 of FIG. 5. Referring to FIG. 7, in operation 721, the source device receives information on a dissipation power $P_{dissipation}$ from a target device. In operation 723, the source device controls a voltage supplied to a power converter in the source device so that an amount of power $PA_{out}$ output from the power converter satisfies condition 1, as described above.

Referring to FIG. 8A, in operation 841, the source device detects an amount of power $P_{receive}$ received by the target device. The source device may receive, from the target device, information on the amount of power $P_{receive}$, and may detect the amount of power $P_{receive}$.

For example, if the amount of power $P_{receive}$ is beyond a predetermined range, the source device controls a control voltage of a power amplifier in the source device, namely, a voltage supplied to the power amplifier, based on a predetermined window size. In other words, if the amount of the power $P_{receive}$ is beyond the predetermined range, the source device controls an amount of a operation power based on the predetermined window size. In FIG. 8A, the amount of the operation power is assumed to be identical to the amount of power $PA_{out}$. Additionally, if the voltage supplied to the power amplifier is beyond a predetermined control range, the source device is operated in the frequency tracking mode.

In an example in which the amount of power $P_{receive}$ is greater than a first reference value, the source device decreases the voltage supplied to the power amplifier configured to generate the operation power. In another example in which the amount of power $P_{receive}$ is less than a second reference value, the source device increases the voltage supplied to the power amplifier. In this example, if a wireless power transmission efficiency is not maintained due to the increase in the voltage supplied to the power amplifier, the source device redetermines the resonance frequency.

In more detail, in operation 842, the source device determines whether the amount of power $P_{receive}$ is within the predetermined range. The predetermined range may be set based on an amount of reference power Ref and a window size $\Delta$, as illustrated in FIG. 8B.

Figure 8B:
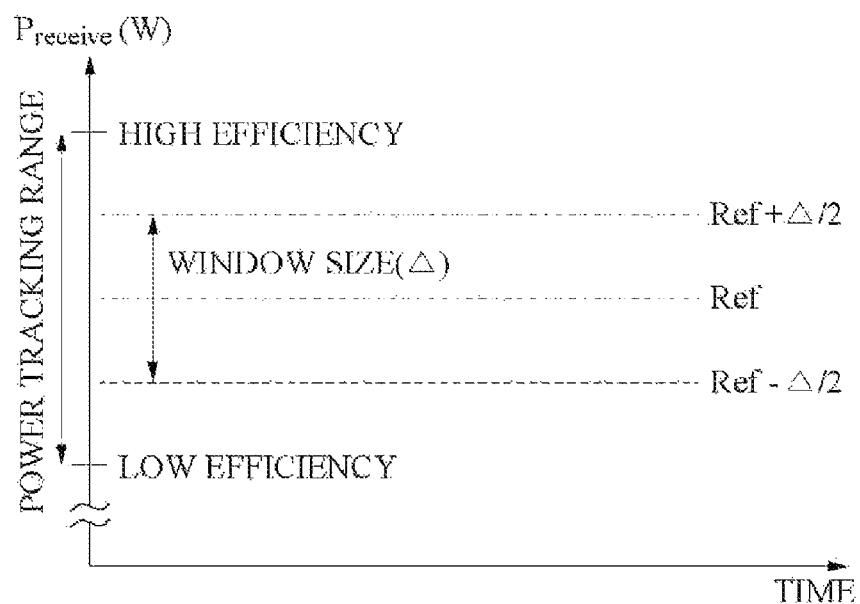
FIG. 8B is a diagram illustrating an example of a range of power control in the power tracking mode.

FIG. 8B illustrates an example of a range of power control in the power tracking mode. Referring to FIG. 8B, an amount of reference power Ref is set to be a dissipation power $P_{dissipation}$ of a target device, or $P_{dissapation}$/Est. Additionally, the amount of reference power Ref remains unchanged based on a setting of a source device. A window size $\Delta$ is set based on the amount of reference power Ref, an efficiency of a power amplifier of the source device, or the wireless power transmission efficiency Est. For example, the window size $\Delta$ may be set to Ref×0.25.

Additionally, Ref+$\Delta$/2 of FIG. 8B is set to a value less than high efficiency, and Ref−$\Delta$/2 of FIG. 8B is set to a value greater than low efficiency. The high efficiency and the low efficiency may be, for example, 92.5% and 76.7%, respectively. For example, if the amount of reference power Ref is set to 100 W, $\Delta$/2 is set to 22 Watt. In this example, $\Delta$/2 is set so that the amount of power $P_{receive}$ is maintained within a predetermined range of the power transmission efficiency. In FIG. 8B, the window size $\Delta$ may be set to a value that is greater than or equal to Ref−$\Delta$/2 and that is equal to or less than Ref+$\Delta$/2. Ref+$\Delta$/2 and Ref−$\Delta$/2 is referred to as a first reference value and a second reference value, respectively.

Referring again to FIG. 8A, in operation 842, the source device determines whether the amount of power $P_{receive}$ is greater than the first reference value, namely, Ref+$\Delta$/2. If the amount of power $P_{receive}$ is greater than the first reference value, in operation 843, the source device decreases the voltage supplied to the power amplifier, for example, the input voltage of the power amplifier 220 of FIG. 2. In this example, an amount the input voltage decreases may be set to be changed. If a constant efficiency of the power amplifier 220 is maintained, an amount of power output from the power amplifier 220 is reduced due to a decrease in the input voltage.

If the amount of power $P_{receive}$ is less than or equal to the first reference value, in operation 844, the source device determines whether the amount of power $P_{receive}$ is less than the second reference value, namely, Ref–Δ/2. If the amount of power $P_{receive}$ is greater than or equal to the second reference value, in operation 846, the source device continues to transmit the operation power in 846. In other words, if the amount of power $P_{receive}$ is within the predetermined range, the source device continues to transmit the operation power.

If the amount of power $P_{receive}$ is less than the second reference value, in operation 845, the source device increases the input voltage of the power amplifier 200 of FIG. 2. In this example, an amount the input voltage increases may be set to be changed. If the constant efficiency of the power amplifier 220 is maintained, the amount of power output from the power amplifier 220 is increased due to an increase in the input voltage.

In operation 847, the source device determines whether the amount of power $PA_{out}$ is greater than $P_{receive}$+IncreaseMax. IncreaseMax indicates a maximum power amount enabling the amount of power $PA_{out}$ to be increased while the wireless power transmission efficiency Est is maintained within the predetermined range. Accordingly, IncreaseMax is set based on the wireless power transmission efficiency Est. For example, if the wireless power transmission efficiency Est is beyond the predetermined range as a distance between the source device and the target device increases, the source device reperforms frequency tracking. IncreaseMax may be set to satisfy the following condition 2:

"IncreaseMax"<$P_{dissipation}$–(Est×$P_{receive}$)   [Condition 2]

In condition 2, the wireless power transmission efficiency Est may be the low efficiency in FIG. 8B. For example, if the amount of power $P_{receive}$ received by the target device is less than the predetermined range, the amount of power $PA_{out}$ output from the power converter needs to be increased. However, even if the amount of power output $PA_{out}$ from the power converter is increased, the source device may set a value of IncreaseMax to maintain the wireless power transmission efficiency Est within the predetermined range.

If the amount of power $PA_{out}$ is less than or equal to the $P_{receive}$+IncreaseMax in 847, the source device reperforms operation 841. If the amount of power $PA_{out}$ is greater than the $P_{receive}$+IncreaseMax, in operation 847, the source device reperforms operation 510 of FIG. 5, or operation 619 of FIG. 6, that is, the frequency tracking mode.

The source device may detect a change in the dissipation power of the target device while continuing to transmit the operation power in operation 846. For example, if the amount of power received by the target device is within the predetermined range, the source device may detect the change in the dissipation power. The change in the dissipation power may refer to a change in a device load included in the target device. The source device may further adjust the voltage supplied to the power converter based on the detected change in the dissipation power. For example, if the device load includes a rechargeable battery, the source device may adjust the voltage supplied to the power converter based on a charging state of the rechargeable battery. In this example, if the rechargeable battery is completely charged above a predetermined level, the source device may adjust the voltage supplied to the power converter. In an example in which the amount of power output from the power converter remains unchanged, if the voltage supplied to the power converter is increased, an amount of current flowing to the device load may be reduced. Accordingly, if the target device needs to be protected after the rechargeable battery is completely charged above the predetermined level, the source device may control the power converter to reduce the amount of current flowing to the device load. In another example in which the amount of the output power is variable, if the voltage supplied to the power converter is increased, the amount of the output power may be increased.

FIG. 9 illustrates an example of a concept of a frequency tracking mode and a power tracking mode. A line 910 represents a change in power received by a target device when only frequency tracking is performed. Additionally, a line 920 represents a change in frequency (e.g., a tracking frequency) adjusted in the frequency tracking mode, and a line 930 represents a change in power received by the target device when both the frequency tracking and the power tracking of FIGS. 7 through 8B are performed. In FIG. 9, the tracking frequency is represented in MHz, and a distance is represented in meters (m).

Hereinafter, the term "resonator" in FIGS. 10A through 12B may include, for example, a source resonator and/or a target resonator.

Figure 10A:
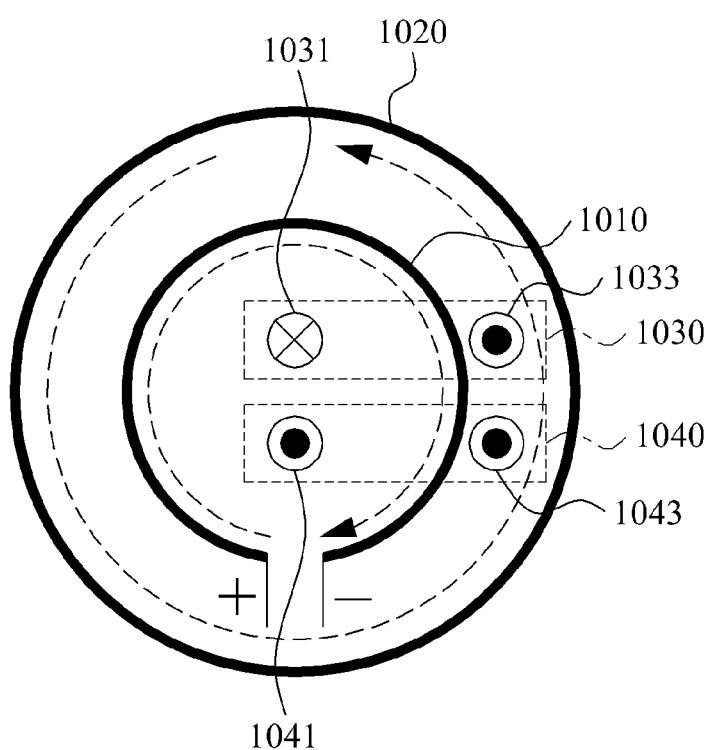
FIGS. 10A through 10B are diagrams illustrating examples of distributions of magnetic fields in feeders and resonators.
Figure 10B:
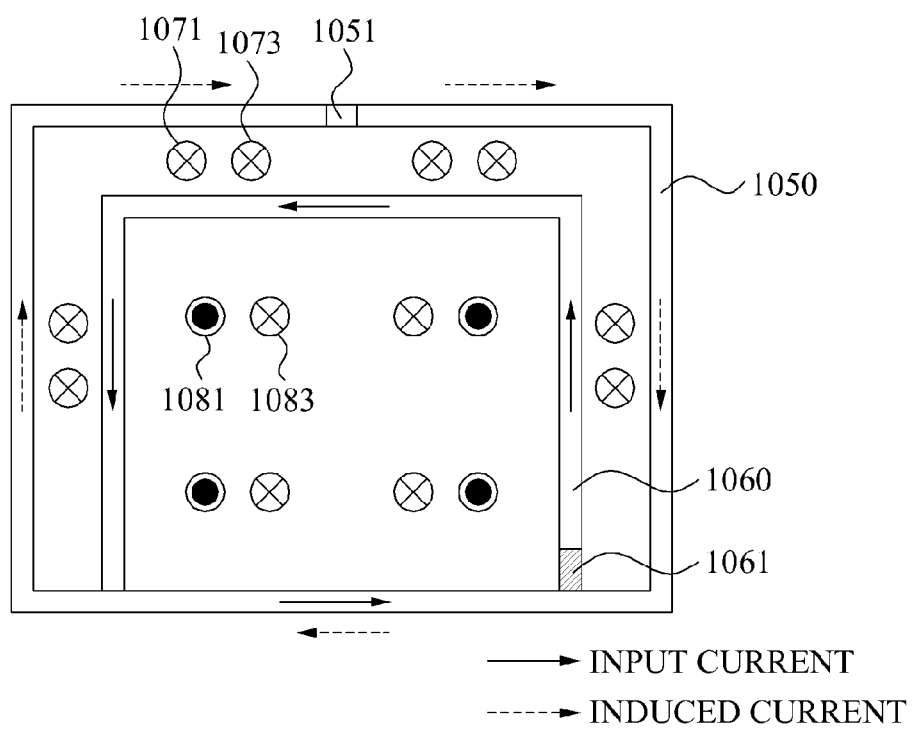

FIGS. 10A and 10B illustrate examples of distributions of magnetic fields in feeders and resonators. In an example in which a resonator receives power supply through a separate feeder, magnetic fields are formed in both the feeder and the resonator.

Referring to FIG. 10A, as an input current flows in a feeder 1010, a magnetic field 1030 is formed. A direction 1031 of the magnetic field 1030 within the feeder 1010 includes a phase opposite to a phase of a direction 1033 of the magnetic field 1030 outside the feeder 1010. The magnetic field 1030 causes an induced current to be formed in a resonator 1020. A direction of the induced current is opposite to a direction of the input current.

Due to the induced current, a magnetic field 1040 is formed in the resonator 1020. Directions of the magnetic field 1040 in all positions of the resonator 1020 are identical. Accordingly, a direction 1041 of the magnetic field 1040 in one position of the resonator 1020 includes the same phase as a direction 1043 of the magnetic field 1040 in another position of the resonator 1020.

Consequently, when the magnetic field 1030 formed by the feeder 1010 and the magnetic field 1040 formed by the resonator 1020 are combined, a strength of a total magnetic field decreases within the feeder 1010, but increases outside the feeder 1010. In an example in which a power is supplied to the resonator 1020 through the feeder 1010, the strength of the total magnetic field decreases in a center of the resonator 1020, but increases in outer edges of the resonator 1020. When a magnetic field is randomly distributed in the resonator 1020, it may be difficult to perform impedance matching, since an input impedance may frequently vary. Additionally, when the strength of the total magnetic field is increased, an efficiency of wireless power transmission may be increased. Conversely, when the strength of the total magnetic field is decreased, the efficiency of wireless power transmission may be decreased. Accordingly, a power transmission efficiency may be reduced on average.

FIG. 10B illustrates an example of a wireless power transmitter in which a resonator 1050 and a feeder 1060 include a common ground. The resonator 1050 includes a capacitor 1051. The feeder 1060 receives a radio frequency (RF) signal via a port 1061.

For example, when the feeder 1060 receives the RF signal, an input current is generated in the feeder 1060. The input current flowing in the feeder 1060 causes a magnetic field to be formed, and the magnetic field induces a current in the resonator 1050. Additionally, another magnetic field is formed due to the induced current flowing in the resonator 1050. A direction of the input current flowing in the feeder 1060 includes a phase opposite to a phase of a direction of the induced current flowing in the resonator 1050. Accordingly, in a region between the resonator 1050 and the feeder 1060, a direction 1071 of the magnetic field formed due to the input current includes the same phase as a direction 1073 of the magnetic field formed due to the induced current, and thus, a strength of a total magnetic field increases. Conversely, within the feeder 1060, a direction 1081 of the magnetic field formed due to the input current includes a phase opposite to a phase of a direction 1083 of the magnetic field formed due to the induced current, and thus, the strength of the total magnetic field decreases. Therefore, the strength of the total magnetic field decreases in the center of the resonator 1050, but increases in outer edges of the resonator 1050.

The feeder 1060 adjusts an internal area of the feeder 1060 to determine an input impedance. The input impedance refers to an impedance viewed in a direction from the feeder 1060 to the resonator 1050. When the internal area of the feeder 1060 is increased, the input impedance is increased. Conversely, when the internal area of the feeder 1060 is reduced, the input impedance is reduced. Since the magnetic field is randomly-distributed in the resonator 1050 despite a reduction in the input impedance, a value of the input impedance varies depending on a location of a target device. Accordingly, a separate matching network may be required to match the input impedance to an output impedance of a PA. For example, when the input impedance is increased, a separate matching network may be used to match the increased input impedance to a relatively low output impedance.

Figure 11A:
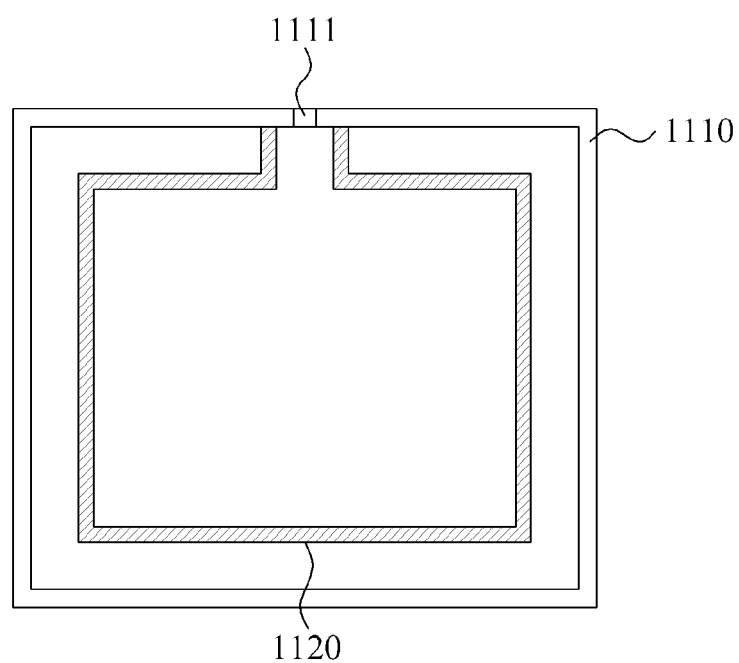
FIGS. 11A and 11B are diagrams illustrating an example of a wireless power transmitter.

FIG. 11A illustrates an example of a wireless power transmitter. The wireless power transmitter includes a resonator 1110 and a feeding unit 1120. The resonator 1110 includes a capacitor 1111. The feeding unit 1120 is electrically-connected to both ends of the capacitor 1111.

Figure 11B:
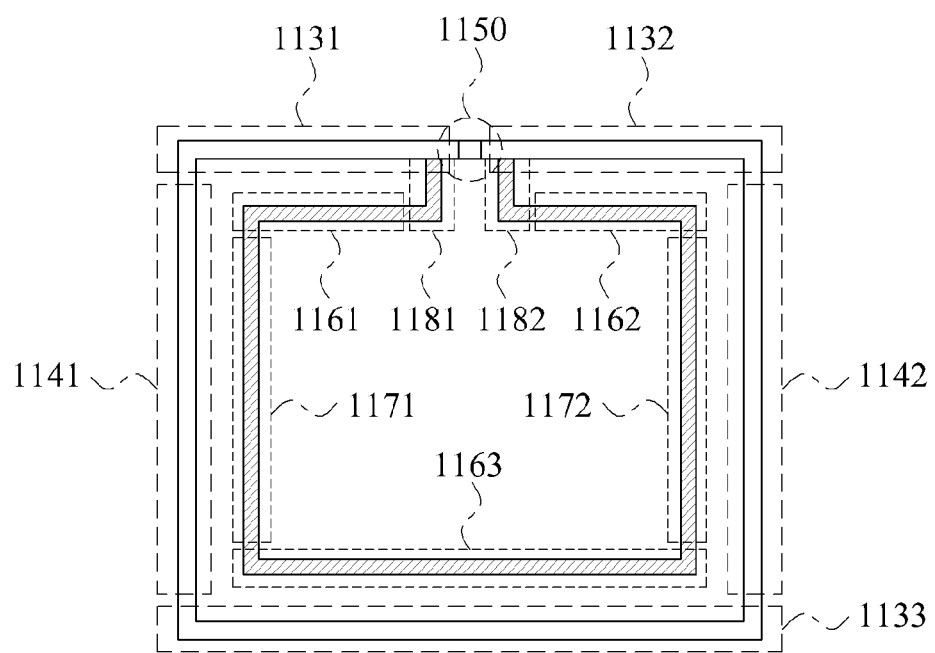

FIG. 11B illustrates, in more detail, an example of the wireless power transmitter of FIG. 11A. The resonator 1110 includes a first transmission line, a first conductor 1141, a second conductor 1142, and at least one first capacitor 1150.

The first capacitor 1150 is inserted in series between a first signal conducting portion 1131 and a second signal conducting portion 1132 in the first transmission line, and an electric field is confined within the first capacitor 1150. For example, the first transmission line may include at least one conductor in an upper portion of the first transmission line, and may also include at least one conductor in a lower portion of the first transmission line. Current may flow through the conductor disposed in the upper portion of the first transmission line, and the conductor disposed in the lower portion of the first transmission line may be electrically-grounded. Referring to FIG. 11B, a conductor disposed in an upper portion of the first transmission line is separated into and thereby refers to the first signal conducting portion 1131 and the second signal conducting portion 1132. A conductor disposed in a lower portion of the first transmission line refers to a first ground conducting portion 1133.

As illustrated in FIG. 11B, the resonator 1110 includes a two-dimensional (2D) structure. The first transmission line includes the first signal conducting portion 1131 and the second signal conducting portion 1132 in the upper portion of the first transmission line. In addition, the first transmission line includes the first ground conducting portion 1133 in the lower portion of the first transmission line. The first signal conducting portion 1131 and the second signal conducting portion 1132 are disposed to face the first ground conducting portion 1133. The current flows through the first signal conducting portion 1131 and the second signal conducting portion 1132.

Additionally, one end of the first signal conducting portion 1131 is electrically-connected (i.e., shorted) to the first conductor 1141, and another end of the first signal conducting portion 1131 is electrically-connected to the first capacitor 1150. One end of the second signal conducting portion 1132 is electrically-connected to the second conductor 1142, and another end of the second signal conducting portion 1132 is electrically-connected to the first capacitor 1150. Accordingly, the first signal conducting portion 1131, the second signal conducting portion 1132, the first ground conducting portion 1133, and the conductors 1141 and 1142 are electrically-connected to each other, so that the resonator 1110 includes an electrically closed-loop structure. The term "closed-loop structure" may include a polygonal structure, for example, a circular structure, a rectangular structure, and/or other types of structures that is electrically-closed.

The first capacitor 1150 is inserted into an intermediate portion of the first transmission line. For example, the first capacitor 1150 is inserted into a space between the first signal conducting portion 1131 and the second signal conducting portion 1132. The first capacitor 1150 may include a shape of, for example, a lumped element, a distributed element, and/or other types of elements. For example, a distributed capacitor configured as a distributed element may include zigzagged conductor lines and a dielectric material including a high permittivity between the zigzagged conductor lines.

When the first capacitor 1150 is inserted into the first transmission line, the resonator 1110 may include a characteristic of a metamaterial. The metamaterial indicates a material including a predetermined electrical property that has not been discovered in nature, and thus, may include an artificially-designed structure. An electromagnetic characteristic of the materials existing in nature may include a unique magnetic permeability and/or a unique permittivity. Most materials may include a positive magnetic permeability and/or a positive permittivity.

In the case of most materials, a right hand rule may be applied to an electric field, a magnetic field, and a Poynting vector, and thus, the corresponding materials may be referred to as right handed materials (RHMs). However, the metamaterial including a magnetic permeability and/or a permittivity absent in nature may be classified into, for example, an epsilon negative (ENG) material, a mu negative (MNG) material, a double negative (DNG) material, a negative refractive index (NRI) material, a left-handed (LH) material, and/or other types of materials, based on a sign of the corresponding permittivity and/or magnetic permeability.

When a capacitance of the first capacitor 1150 inserted as the lumped element is appropriately determined, the resonator 1110 may include the characteristic of the metamaterial. Because the resonator 1110 may include a negative magnetic permeability by appropriately adjusting a capacitance of the first capacitor 1150, the resonator 1110 may also be referred to as an MNG resonator. Various criteria may be applied to determine the capacitance of the first capacitor 1150. For example, the various criteria may include a criterion to enable the resonator 1110 to include the characteristic of the metamaterial, a criterion to enable the resonator 1110 to include a negative magnetic permeability in a target frequency, a criterion to enable the resonator 1110 to include a zeroth-order resonance characteristic in the target frequency, and/or other types of criteria. Based on at least one criterion among the aforementioned criteria, the capacitance of the first capacitor 1150 may be determined.

The resonator 1110, also referred to as the MNG resonator 1110, may include a zeroth-order resonance characteristic of including, as a resonance frequency, a frequency when a propagation constant is "0". Because the resonator 1110 may include the zeroth-order resonance characteristic, the resonance frequency may be independent with respect to a physical size of the MNG resonator 1110. By appropriately designing the first capacitor 1150, the MNG resonator 1110 may sufficiently change the resonance frequency. Accordingly, the physical size of the MNG resonator 1110 may not be changed.

In a near field, the electric field may be concentrated on the first capacitor 1150 inserted into the first transmission line. Accordingly, due to the first capacitor 1150, the magnetic field may become dominant in the near field. The MNG resonator 1110 may include a relatively high Q-factor using the first capacitor 1150 of the lumped element. Thus, it is possible to enhance a power transmission efficiency. For example, the Q-factor may indicate a level of an ohmic loss or a ratio of a reactance with respect to a resistor in a wireless power transmission. The efficiency of the wireless power transmission may increase according to an increase in the Q-factor.

Although not illustrated in FIG. 11B, a magnetic core may be further provided to pass through the MNG resonator 1110. The magnetic core may increase a power transmission distance.

Referring to FIG. 11B, the feeding unit 1120 includes a second transmission line, a third conductor 1171, a fourth conductor 1172, a fifth conductor 1181, and a sixth conductor 1182. The second transmission line includes a third signal conducting portion 1161 and a fourth signal conducting portion 1162 in an upper portion of the second transmission line. In addition, the second transmission line includes a second ground conducting portion 1163 in a lower portion of the second transmission line. The third signal conducting portion 1161 and the fourth signal conducting portion 1162 are disposed to face the second ground conducting portion 1163. Current flows through the third signal conducting portion 1161 and the fourth signal conducting portion 1162.

Additionally, one end of the third signal conducting portion 1161 is electrically-connected to the third conductor 1171, and another end of the third signal conducting portion 1161 is electrically-connected to the fifth conductor 1181. One end of the fourth signal conducting portion 1162 is electrically-connected to the fourth conductor 1172, and another end of the fourth signal conducting portion 1162 is electrically-connected to the sixth conductor 1182. The fifth conductor 1181 is electrically-connected to the first signal conducting portion 1131, and the sixth conductor 1182 is electrically-connected to the second signal conducting portion 1132. The fifth conductor 1181 and the sixth conductor 1182 are electrically-connected in parallel to both ends of the first capacitor 1150. The fifth conductor 1181 and the sixth conductor 1182 are used as input ports to receive an RF signal.

Accordingly, the third signal conducting portion 1161, the fourth signal conducting portion 1162, the second ground conducting portion 1163, the third conductor 1171, the fourth conductor 1172, the fifth conductor 1181, the sixth conductor 1182, and the resonator 1110 are electrically-connected to each other, so that the resonator 1110 and the feeding unit 1120 include an electrically closed-loop structure. When the RF signal is received via the fifth conductor 1181 or the sixth conductor 1182, an input current flows in the feeding unit 1120 and the resonator 1110, a magnetic field is formed due to the input current, and a current is induced in the resonator 1110 due to the formed magnetic field. A direction of the input current flowing in the feeding unit 1120 is identical to a direction of the induced current flowing in the resonator 1110, and thus, a strength of a total magnetic field increases in a center of the resonator 1110, but decreases in outer edges of the resonator 1110.

An input impedance is determined based on an area of a region between the resonator 1110 and the feeding unit 1120, and accordingly, a separate matching network used to match the input impedance to an output impedance of a power amplifier may not be required. For example, even when the matching network is used, the input impedance may be determined by adjusting a size of the feeding unit 1120, and thus, a structure of the matching network may be simplified. The simplified structure of the matching network may minimize a matching loss of the matching network.

The second transmission line, the third conductor 1171, the fourth conductor 1172, the fifth conductor 1181, and the sixth conductor 1182 form the same structure as the resonator 1110. In an example in which the resonator 1110 includes a loop structure, the feeding unit 1120 may also include a loop structure. In another example in which the resonator 1110 includes a circular structure, the feeding unit 1120 may also include a circular structure.

FIG. 12A illustrates an example of a distribution of a magnetic field in a resonator based on feeding of a feeding unit. FIG. 12A more briefly illustrates the resonator 1110 and the feeding unit 1120 of FIG. 11A.

A feeding operation in a wireless power transmission refers to supplying a power to a resonator, or refers to supplying AC power to a rectification unit. FIG. 12A illustrates a direction of an input current flowing in the feeding unit, and a direction of an induced current induced in the resonator. Additionally, FIG. 12A illustrates a direction of a magnetic field formed due to the input current, and a direction of a magnetic field formed due to the induced current.

A fifth conductor or a sixth conductor of the feeding unit may be used as an input port 1210. The input port 1210 receives an RF signal output from a PA. The PA may increase and decrease an amplitude of the RF signal, on demand of a target device. The RF signal is displayed in the form of the input current flowing in the feeding unit. The input current flows in a clockwise direction in the feeding unit, along a transmission line of the feeding unit. The fifth conductor is electrically-connected to the resonator, e.g., a first signal conducting portion of the resonator. Accordingly, the input current flows in the resonator, as well as, in the feeding unit. The input current flows in a counterclockwise direction in the resonator. The input current flowing in the resonator causes a magnetic field to be formed so that an induced current is generated in the resonator due to the magnetic field. The induced current flows in a clockwise direction in the resonator. The induced current transfers energy to a capacitor of the resonator, and a magnetic field is formed due to the induced current. The input current flowing in the feeding unit and the resonator is indicated by a solid line of FIG. 12A, and the induced current flowing in the resonator is indicated by a dotted line of FIG. 12A.

A direction of a magnetic field formed due to current may be determined based on the right hand rule. As illustrated in FIG. 12A, within the feeding unit, a direction 1221 of the magnetic field formed due to the input current flowing in the feeding unit is identical to a direction 1223 of the magnetic field formed due to the induced current. Accordingly, a strength of a total magnetic field increases within the feeding unit.

Additionally, in a region between the feeding unit and the resonator, a direction 1233 of the magnetic field formed due to the input current flowing in the feeding unit includes a phase opposite to a phase of a direction 1231 of the magnetic field formed due to the induced current. Accordingly, the strength of the total magnetic field decreases in the region between the feeding unit and the resonator.

Typically, a strength of a magnetic field decreases in a center of a resonator with a loop structure, and increases in outer edges of the resonator. However, referring to FIG. 12A, the feeding unit is electrically-connected to both ends of the capacitor of the resonator, and accordingly, the induced current flows in the same direction as the input current of the feeding unit. Since the induced current flows in the same direction as the input current of the feeding unit, the strength of the total magnetic field increases within the feeding unit, and decreases outside the feeding unit. As a result, the strength of the total magnetic field increases in a center of the resonator with the loop structure, and decreases in the outer edges of the resonator, due to the feeding unit. Thus, the strength of the total magnetic field is equalized within the resonator.

Additionally, a power transmission efficiency of transferring a power from the resonator to a target resonator is proportional to the strength of the total magnetic field formed in the resonator. When the strength of the total magnetic field increases in the center of the resonator, the power transmission efficiency also increases.

Figure 12B:
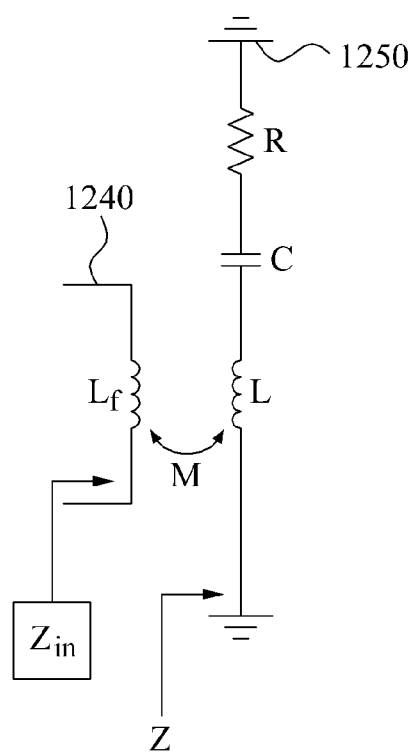
FIG. 12B is a diagram illustrating examples of equivalent circuits of a feeding unit and a resonator.

FIG. 12B illustrates an equivalent circuit of a feeding unit 1240, and an equivalent circuit of a resonator 1250. An input impedance $Z_{in}$ viewed in a direction from the feeding unit 1240 to the resonator 1250 may be determined, as given in Equation 4.

$$Z_{in} = \frac{(\omega M)^2}{Z} \quad \text{[Equation 4]}$$

In Equation 4, M denotes a mutual inductance between the feeding unit 1240 and the resonator 1250, ω denotes a resonance frequency between the feeding unit 1240 and the resonator 1250, and Z denotes an impedance viewed in a direction from the resonator 1250 to a target device. The input impedance $Z_{in}$ is proportional to the mutual inductance M. Accordingly, the input impedance $Z_{in}$ may be controlled by adjusting the mutual inductance M. The mutual inductance M may be adjusted based on an area of a region between the feeding unit 1240 and the resonator 1250. The area of the region between the feeding unit 1240 and the resonator 1250 may be adjusted based on a size of the feeding unit 1240. The input impedance $Z_{in}$ may be determined based on the size of the feeding unit 1240, and thus, a separate matching network may not be required to perform impedance matching with an output impedance of a PA.

Figure 13:
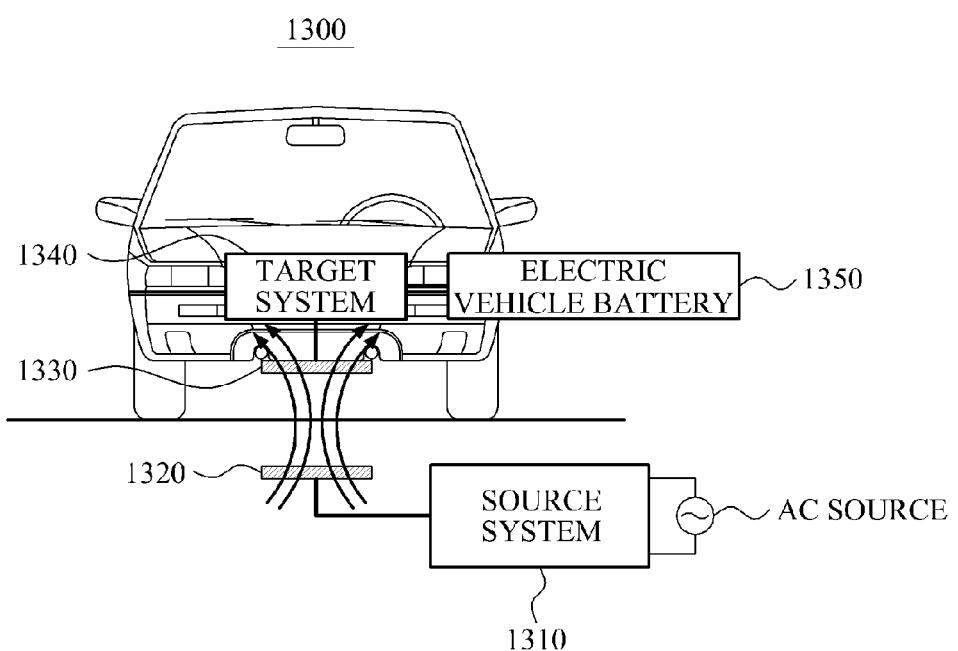
FIG. 13 is a diagram illustrating an example of an electric vehicle charging system.

FIG. 13 illustrates an example of an electric vehicle charging system. Referring to FIG. 13, an electric vehicle charging system 1300 includes a source system 1310, a source resonator 1320, a target resonator 1330, a target system 1340, and an electric vehicle battery 1350.

The source system 1310 and the source resonator 1320 in the electric vehicle charging system 1300 may function as a source. Additionally, the target resonator 1330 and the target system 1340 in the electric vehicle charging system 1300 may function as a target.

The source system 1310 may include an alternating current-to-direct current (AC/DC) converter, a power detector, a power converter, and a control/communication unit. The target system 1340 may include a rectification unit, a DC-to-DC (DC/DC) converter, a switch unit, a charging unit, and a control/communication unit. The electric vehicle battery 1350 may be charged by the target system 1340. The electric vehicle charging system 1300 may use a resonant frequency in a band of a few kilohertz (KHz) to tens of MHz.

The source system 1310 may generate power, based on a type of charging vehicle, a capacity of a battery, and a charging state of a battery, and may supply the generated power to the target system 1340. The source system 1310 may control the source resonator 1320 and the target resonator 1330 to be aligned. For example, when the source resonator 1320 and the target resonator 1330 are not aligned, the controller of the source system 1310 may transmit a message to the target system 1340, and may control alignment between the source resonator 1320 and the target resonator 1330.

For example, when the target resonator 1330 is not located in a position enabling maximum magnetic resonance, the source resonator 1320 and the target resonator 1330 may not be aligned. When a vehicle does not stop accurately, the source system 1310 may induce a position of the vehicle to be adjusted, and may control the source resonator 1320 and the target resonator 1330 to be aligned. The source system 1310 and the target system 1340 may transmit or receive an ID of a vehicle, or may exchange various messages, through communication.

The descriptions of FIGS. 1 through 12B may be applied to the electric vehicle charging system 1300. However, the electric vehicle charging system 1300 may use a resonant frequency in a band of a few KHz to tens of MHz, and may transmit power that is equal to or higher than tens of watts to charge the electric vehicle battery 1350.

According to the teachings above, there is provided a wireless power transmission system, which controls a resonance frequency based on a power transmission efficiency. Additionally, the wireless power transmission system maintains a constant power transmission efficiency and efficiently controls an amount of power to be transmitted.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. For example, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments to accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling power in a wireless power transmission system, comprising:
   determining a resonance frequency of the wireless power transmission system in which a wireless power transmission efficiency is greater than or equal to a predetermined value;
   generating an operation power based on the wireless power transmission efficiency, the operation power being used to operate a target device;
   transmitting the operation power to the target device; and
   controlling an amount of the operation power received by the target device to be within a predetermined range,
   wherein the controlling comprises redetermining the resonance frequency if the wireless power transmission efficiency is less than the predetermined value.

2. The method of claim 1, further comprising:
   generating the operation power further based on a dissipation power of the target device.

3. The method of claim 1, wherein the determining of the resonance frequency comprises:
   supplying a voltage to a power converter;
   generating a tracking power based on the voltage and a reference resonance frequency, the tracking power being used to track the resonance frequency, and the power converter being configured to output the tracking power;
   transmitting the tracking power to the target device;
   determining a tracking power transmission efficiency; and
   adjusting the reference resonance frequency if the tracking power transmission efficiency is less than the predetermined value.

4. The method of claim 3, wherein the determining of the tracking power transmission efficiency comprises:
   detecting an amount of the tracking power output from the power converter;
   receiving, from the target device, information on the amount of the tracking power received by the target device; and
   determining a ratio of the amount of the tracking power received by the target device to the amount of the tracking power output from the power converter.

5. The method of claim 1, wherein the generating of the operation power comprises:
   receiving, from the target device, information on a dissipation power of the target device; and
   supplying a voltage to a power converter configured to output the operation power so that $$PA_{out} \geq P_{dissipation} \times \frac{1}{E_{st}}$$

an amount of the operation power output from the power converter satisfies the following condition:
   wherein $PA_{out}$ denotes the amount of the operation power output from the power converter, $P_{dissipation}$ denotes the dissipation power of the target device, and $E_{st}$ denotes the wireless power transmission efficiency.

6. The method of claim 1, wherein the controlling of the amount of the operation power comprises:
   detecting the amount of the operation power received by the target device;
   determining whether the amount of the operation power received by the target device is within the predetermined range;
   continuing to transmit the operation power to the target device if the amount of the power received by the target device is within the predetermined range; and
   controlling an amount of the operation power based on a predetermined window size if the amount of the power received by the target device is beyond the predetermined range.

7. The method of claim 6, wherein the controlling of the amount of the operation power further comprises:
   supplying a voltage to a power converter;

decreasing the voltage if the amount of the power received by the target device is greater than a first reference value;
increasing the voltage if the amount of the power received by the target device is less than a second reference value; and
redetermining the resonance frequency if the voltage is increased and the wireless power transmission efficiency is not maintained.

8. The method of claim 6, wherein the continuing to transmit the operation power comprises:
supplying a voltage to a power converter;
detecting a change in a dissipation power of the target device; and
adjusting the voltage based on the change in the dissipation power.

9. The method of claim 1, further comprising:
supplying a voltage to a power converter;
detecting a charging state of a battery; and
adjusting the voltage based on the charging state of the battery.

10. A method of controlling power in a wireless power transmission system, comprising:
determining a resonance frequency of the wireless power transmission system in which a wireless power transmission efficiency is greater than or equal to a predetermined value;
generating a power based on the wireless power transmission efficiency;
transmitting the power to a target device; and
controlling an amount of the power received by the target device to be within a predetermined range,
wherein the controlling comprises redetermining the resonance frequency if the wireless power transmission efficiency is less than the predetermined value.

11. The method of claim 10, wherein the controlling of the amount of the power comprises:
detecting the amount of the power received by the target device;
determining whether the amount of the power received by the target device is within the predetermined range;
continuing to transmit the power to the target device if the amount of the power received by the target device is within the predetermined range; and
controlling an amount of the power based on a predetermined window size if the amount of the power received by the target device is beyond the predetermined range.

12. A method of controlling power in a wireless power transmission system, comprising:
receiving a tracking power from a source device, the tracking power being used to track a resonance frequency of the wireless power transmission system;
receiving an operation power from the source device if the resonance frequency is tracked by the source device, the operation power being used to operate a target device;
transmitting, to the source device, information on an amount of the received tracking power, a dissipation power of the target device, and an amount of the received operation power; and
controlling the amount of the received operation power to be within a predetermined range,
wherein the resonance frequency is redetermined by the source device if a wireless power transmission efficiency is less than a predetermined value.

13. The method of claim 12, further comprising:
detecting information on a charging state of a rechargeable battery; and
transmitting the detected information to the source device.

14. A source device in a wireless power transmission system, comprising:
a controller configured to determine a resonance frequency of the wireless power transmission system in which a wireless power transmission efficiency is greater than or equal to a predetermined value;
a power converter configured to generate and output an operation power based on the wireless power transmission efficiency, the operation power being used to operate a target device; and
a source resonator configured to transmit the operation power to the target device,
wherein the controller is further configured to control an amount of the operation power received by the target device to be within a predetermined range, and redetermining the resonance frequency if the wireless power transmission efficiency is less than the predetermined value.

15. The source device of claim 14, wherein the controller is further configured to generate the operation power based on a dissipation power of the target device.

16. The source device of claim 14, wherein:
the controller is further configured to supply a voltage to the power converter;
the power converter is further configured to generate a tracking power based on the voltage and a reference resonance frequency, the tracking power being used to track the resonance frequency, and transmit the tracking power to the target device; and
the controller is further configured to determine a tracking power transmission efficiency, and adjust the reference resonance frequency if the tracking power transmission efficiency is less than the predetermined value.

17. The source device of claim 14, wherein the controller is further configured to:
receive, from the target device, information on a dissipation power of the target device; and
supply a voltage to the power converter so that an amount of the operation power output $$PA_{out} \geq P_{dissipation} \times \frac{1}{E_{st}}$$

from the power converter satisfies the following condition:
wherein $PA_{out}$ denotes the amount of the operation power output from the power converter, $P_{dissipation}$ denotes the dissipation power of the target device, and $E_{st}$ denotes the wireless power transmission efficiency.

18. The source device of claim 14, wherein the controller is further configured to:
detect the amount of the operation power received by the target device;
determine whether the amount of the power received by the target device is within the predetermined range; and
control an amount of the operation power based on a predetermined window size if the amount of the power received by the target device is beyond the predetermined range.

19. The source device of claim 18, wherein the controller is further configured to:
supply a voltage to a power converter;

detect a change in a dissipation power of the target device if the amount of the power received by target device is within the predetermined range; and adjust the voltage based on the change in the dissipation power.

20. A target device in a wireless power transmission system, comprising:

a target resonator configured to receive a tracking power from a source device, the tracking power being used to track a resonance frequency of the wireless power transmission system, and receive an operation power from the source device if the resonance frequency is tracked by the source device, the operation power being used to operate the target device; and a controller configured to transmit, to the source device, information on an amount of the received tracking power, a dissipation power of the target device, and an amount of the received operation power, and control the amount of the received operation power to be within a predetermined range, wherein the resonance frequency is redetermined by the source device if a wireless power transmission efficiency is less than a predetermined value.

21. The target device of claim 20, further comprising:

a rechargeable battery, wherein the controller is further configured to detect information on a charging state of the rechargeable battery, and transmit the detected information to the source device.

* * * * *